United States Patent
Kupcikevicius

[15] 3,659,317
[45] May 2, 1972

[54] STUFFING APPARATUS
[72] Inventor: Vytautas Kupcikevicius, Chicago, Ill.
[73] Assignee: Union Carbide Corporation, New York, N.Y.
[22] Filed: Mar. 30, 1970
[21] Appl. No.: 23,934

[52] U.S. Cl. .................................................17/35, 17/41
[51] Int. Cl. ...........................................A22c 11/06
[58] Field of Search ...............................17/35, 41

[56] References Cited

UNITED STATES PATENTS

| | | | |
|---|---|---|---|
| 3,009,195 | 11/1961 | Dixon et al. ..........................17/39 |
| 1,107,184 | 8/1914 | Priban ....................................17/35 |
| 2,330,496 | 9/1943 | Kidd ......................................17/41 X |
| 3,422,489 | 1/1969 | Middleton ..............................17/35 |
| 3,108,318 | 10/1963 | Miller et al. ...........................17/39 |

*Primary Examiner*—Samuel Koren
*Assistant Examiner*—J. F. Pitrelli
*Attorney*—Paul A. Rose, John F. Hohmann and Franklyn Schoenberg

[57] ABSTRACT

Apparatus is disclosed for stuffing a conglomerate meat mass into a flexible container which comprises a stuffing means, shut-off and/or severing means mounted on the outlet end of said stuffing means comprising a member mounted on the outlet end of the stuffing means and a cooperating moving member adjacent to and aligned with said mounted member and means for advancing and retracting said cooperating moving member into and out of positive engagement with said mounted member wherein such engagement seals said outlet end of the stuffing means, severs product protuding therefrom and stops passage of product therefrom.

8 Claims, 7 Drawing Figures

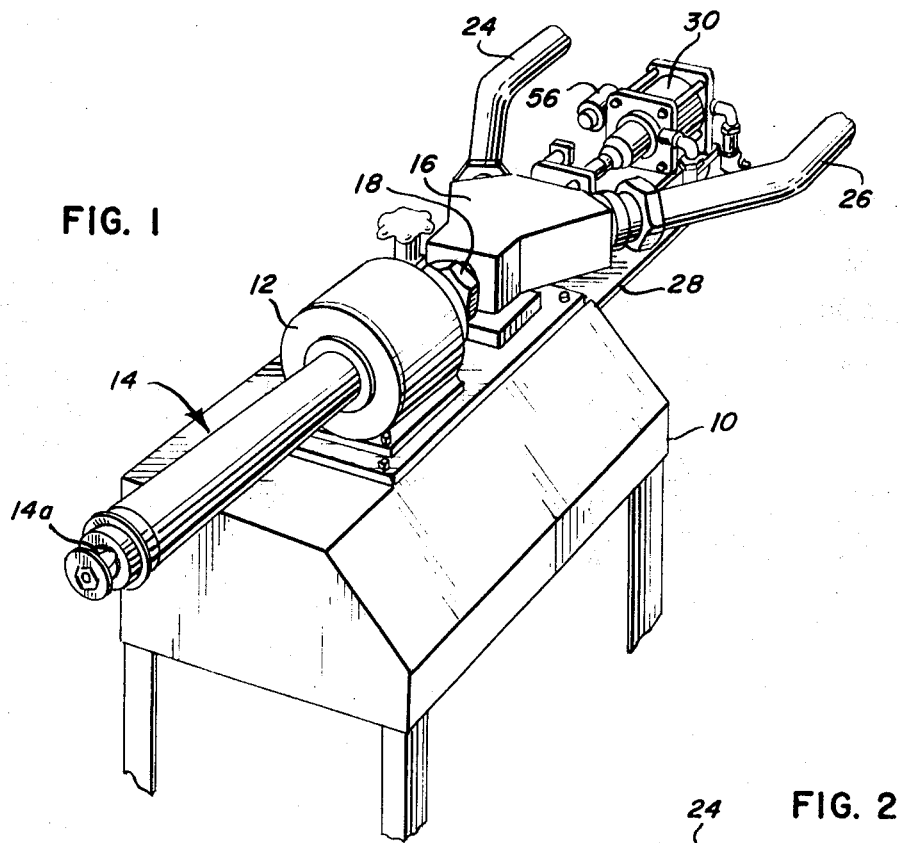

STUFFING APPARATUS

The present invention relates to apparatus for stuffing a mass of material into a flexible container and more particularly to apparatus for stuffing a predetermined amount of a conglomerate food mass into a flexible casing as in the preparation of encased food products such as poultry rolls, beef rolls and the like.

In the art of producing sausages and similar meat products, finely divided meat compositions commonly referred to as emulsions are conventionally stuffed into a casing material which may be of natural or manufactured materials. For many years the apparatus and methods employed to prepare the encased food products and particularly food products encased in large casings, have relied upon manual manipulation in controlling the stuffing of food emulsion into casings. Recently advances in the art have resulted in the introduction of apparatus for machine control of the stuffing operation and thereby providing means for preparing uniformly sized encased food products, as for example, disclosed in U.S. Pat. Nos. 2,871,508; 2,999,270; 3,264,679; 3,317,950; 3,454,980; and 3,457,588.

Generally, such apparatus has been quite satisfactory for emulsion type product. However, when it is desired to encase certain types of food products, as, for example, a conglomerate food mass containing a variety of sizes or a product containing predominately chunks of material, a problem has been encountered due to the presence of food product, particularly chunks, protruding from the outlet end of the stuffing tube at the termination of the stuffing cycle that hinders the efficient operation of the casing clipping or closing apparatus.

The term "food product," as used throughout this specification and in the appended claims, should be understood to include and is intended to refer those food products commonly termed food emulsion as well as any food product containing discrete pieces or any product of a food or non-food nature that is formable into a mass that may be stuffed into a flexible container.

It is an object of the present invention to provide in association with a stuffing apparatus means for positive interruption of the flow of material from the outlet end of the stuffing tube when a predetermined weight or volume of material has been encased.

Another object is to provide in association with a stuffing apparatus means for producing encased food products containing a plurality of types and/or sizes of food materials.

These and other objects of the present invention will become apparent from the following discussion together with the accompanying drawing.

It has now been found that the objects of the invention can be generally attained by providing apparatus comprising a stuffing means having an inlet end connected to a source of food product and an outlet end; shut-off means mounted on the outlet end of said stuffing means, said shut-off means comprising a mounted member and a cooperating moving member; and means for advancing and retracting said cooperating moving member into and out of positive engagement with said mounted member wherein such engagement seals said outlet end and stops passage of food products therefrom. The stuffed casing produced using the apparatus of the present invention may be readily clipped or closed off, in general, using clipping or closing devices well known in the art.

In the apparatus of the present invention a shut-off means is employed mounted on the outlet end of a stuffing means, said stuffing means being preferably any conventional stuffing horn having an inlet end connected to a source of food product and an outlet end. Said shut-off means comprises a member mounted on the outlet end of the stuffing horn and a cooperating moving member mounted adjacent to and aligned with said mounted member. The cooperating moving member is advanced and retracted into and out of positive engagement with said mounted member, positive engagement thereof stopping the passage of food product from the outlet end of the stuffing horn, and retraction from engagement permitting unrestricted passage of food product from the outlet end of the stuffing horn into the casing to be stuffed.

In one embodiment, the apparatus of the present invention comprises a seat mounted on the outlet end of a stuffing horn, said seat comprising an annular member having a flat end surface and secured to outlet end of said stuffing horn; a cooperating moving member comprising a circular knife edge mounted on one end of a rod extending through the entire length of said stuffing horn said circular knife edge positioned adjacent to and aligned with the flat end surface of said seat, the second end of the rod slidably mounted adjacent to the inlet end of said stuffing horn; and means for reciprocally advancing and retracting said knife-edge into and out of positive engagement with said seat whereby positive engagement thereof severs food chunks protruding from the outlet end of said stuffing horn and stops passage of food products therefrom.

It should be understood, however, that the mounted member of the shut-off means may be, for example, the outlet end of stuffing horn having a shape suitable for mating with the cooperating moving member to seal off the outlet end of the stuffing horn, it may be an annular member mounted on the outlet end having any suitable surface configuration for mating with the cooperating moving member whereby positive engagement thereof will shut off passage of food product from the outlet end of the stuffing horn, or alternately the mounted member may be a circular knife edge positive engagement thereof with the cooperating moving member of suitable surface configuration shutting off passage of food product from the outlet end of the stuffing horn and severing food product protruding therefrom.

The advancing and retracting means of the apparatus of the present invention may be any suitable means for bringing the cooperating moving member into and out of positive engagement with the mounted member including means for rotating the cooperating moving member when in positive engagement with the mounted member.

In addition, the inlet end of the stuffing means of the present invention may be connected to a source of food product or a plurality of sources of food product. In the event that a plurality of sources of food product are to be encased, guide means may be provided to guide each source of food products to the inlet end of said stuffing means without intermixing thereof and whereby individual layers of different food products may be encased in a manner that each individual layer is discernible yet will not separate from each other.

The apparatus of the present invention will become apparent from the following description thereof when considered together with the accompanying drawing which is set forth as being exemplary of one embodiment of the present invention and is not intended, in any way, to be limitative thereof and wherein:

FIG. 1 is a perspective view of one embodiment of the apparatus of the present invention;

FIG. 2 is a plan view, part in section, illustrating the stuffing means of the apparatus of FIG. 1;

FIG. 3 is an enlarged plan view, part in section, illustrating the outlet end of the apparatus of FIG. 1 and a casing gripping carriage spaced therefrom;

Figure 4:
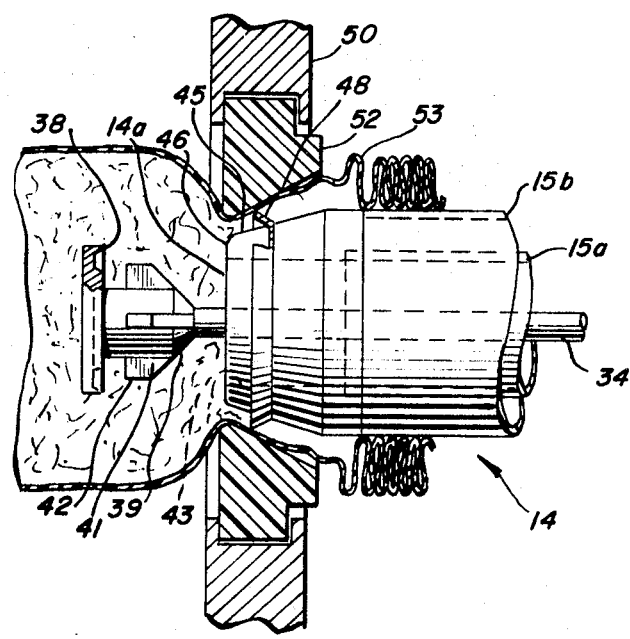
FIG. 4 is a plan view, part in section, illustrating the outlet end of the apparatus of FIG. 1 with the casing gripping carriage in operating position during the stuffing of a casing.

Turning now to the drawing, wherein like reference numerals denote like parts, there is shown in FIGS. 1 and 2 a stuffing machine frame 10 supporting a stuffing horn housing 12 on its top surface. Stuffing horn shown generally as 14 is removably secured in housing 12 with the discharge or outlet end 14(a) extended beyond frame 10. Y-block 16 is aligned with inlet end of stuffing horn 14 and secured to frame 10 adjacent to support housing 12 and the inlet end 14(b) of stuffing horn 14. The inlet end 14(b) of horn 14 and the discharge port 17 of Y-block 16 are secured together by a threaded sanitary fitting 18. Y-block 16 has inlet ports 20 and 22 connected with separate food product supply conduits 24 and 26 by threaded sanitary fittings 25.

A bracket 28 is secured to frame 10 to provide a mounting for securing pneumatic cylinder 30 thereto in central alignment with horn 14 and Y-block 16. The piston rod 32 of cylinder 30 is secured to the end of rod 34 by coupling 35. Rod 34 is slidably secured in Y-block 16 by bearing 36. Rod 34 extends through the entire length of horn 14 and severing, shut-off member shown generally as 40 is secured to the end of rod 34 extending from the outlet end 14(a) of horn 14.

Severing, shut-off member 40 (FIGS. 1, 2 and 3) is machined to provide a circular knife-edge 38, a tapered plug portion 39 and guides 41. The guides 41 are machined to provide outer guide surfaces 42 that mate in a sliding fit with the interior surface 43 of annular member 44 and thus align knife-edge 38 in engagement with member 44.

Stuffing horn 14 is comprised of an inner tube 15(a) for conveying the food product, and an outer tube 15(b). Annular member 44 is concentrically seated and secured to and between the ends of tubes 15(a) and 15(b). Annular member 44 is made with a tapered outer surface 45 and a flat end surface 46 to provide a seat for knife-edge 38. The interior surface 43 of annular member 44 is substantially a continuation of the interior surface of interior tube 15(a) of stuffing horn 14.

A resilient cuff 48 (FIGS. 2, 3 and 4) is secured on the tapered portion 45 of annular member 44. A carriage 50 is adapted by means not shown to reciprocate to and from annular member 44 in a plane parallel to the longitudinal axis of horn 14. Carriage 50 has an annular tapered ring 52 loosely mounted therein concentrically aligned with annular member 44 to provide resilient sealing engagement with cuff 48 to seal the food product within the casing. Carriage 50 is provided with means not shown to regulate such sealing engagement between ring 52 and cuff 48.

Figure 7:
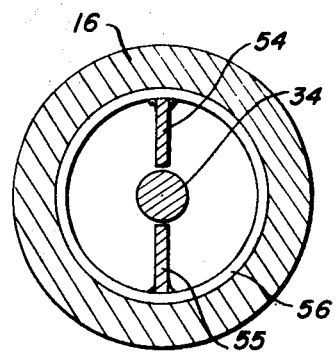
FIG. 7 is an end elevation view taken through line 7—7 of FIG. 5.
Figure 5:
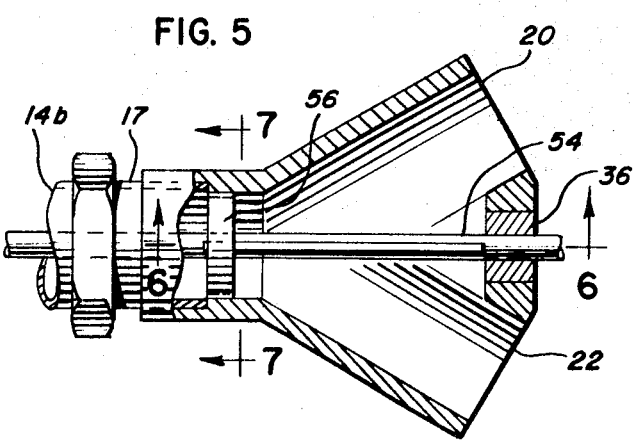
FIG. 5 is an enlarged plan view, part in section, illustrating the inlet end of the apparatus of FIG. 1.
Figure 6:
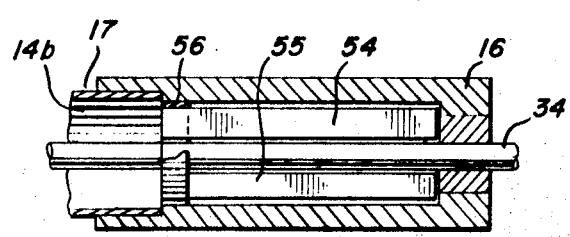
FIG. 6 is a side elevation view taken through line 6—6 of FIG. 5.

Referring now to FIGS. 5, 6 and 7, divider plates 54 and 55 are centrally mounted in Y-block 16, being secured by ring 56 in spaced position above and below rod 34. Divider plates 54 and 55, in conjunction with rod 34 provide a wall separating and guiding the food products supplied by conduits 24 and 26 through Y-block 16. Plates 54 and 55 are preferably of a length sufficient to guide and keep separate the food products fed from conduits 24 and 26 to a union 17 at or near the inlet end 14(b) of horn 14 wherein the food product is conducted through horn 14 to the outlet end 14(a).

Referring to FIGS. 1 and 2 pneumatic button valve 56 is secured on bracket 28 alongside cylinder 30. Secured to piston rod 32 is arm 58 that has an adjustable screw 60 aligned with valve 56. Movement of piston rod 32 on the severing, shut-off stroke engages screw 60 with the operating button of valve 56, and thereby controls the closing or clipping operation of the stuffed casing.

A typical operation of a preferred embodiment of the apparatus of the present invention will now be described and will be more readily understood when considered together with FIGS. 1-7.

Prior to start up, the stuffing apparatus is connected to one or more sources of food product supply such as pumps and/or pneumatic stuffing cylinders and the like by connecting with conduits 24 and 26. In normal start position, the rod end of air cylinder 30 is pressurized thus urging knife-edge 38 of severing shut-off member 40 firmly against square end 46 of annular member 44, thus sealing off the outlet end 14(a) of horn 14. The open end of a pretied, soaked casing is then sheathed about the outlet end 14(a) and outer tube 15(b) of horn 14. When the stuffing cycle is initiated, carriage 50 is indexed to position the inner surface of ring 52 and the casing wall 53 (FIG. 4) against the outer edge of cuff seal 48. The rod end of cylinder 30 is then exhausted and the head end is pressurized, thus moving rod 34 and the severing, shut-off member 40 away from the nosepiece 44 and opening the outlet end of horn 14 (FIG. 4).

The food product supply pumps (not shown) are started and the food product from the supply sources flow into the casing to advance it off horn 14 and fill it.

During the stuffing, cooperation between the inner surface of tapered ring 52 and resilient cuff 48 smooths out the casing wall sheathed on horn 14 and seals off the food product within the stuffing casing.

When the casing is filled to its required volume, the rod end of cylinder 30 is pressurized and the head end is exhausted, thus moving rod 34 and severing shut-off member 40 into a cutting engagement with flat end surface 46 of annular member 44 whereby food product that is protruding from the outlet end 14(a) is severed between knife-edge 38 and face 46 and the outlet end 14(a) of horn 14 is sealed. Conventional clipping or closing off apparatus (not shown) may then close off the end of the stuffed casing.

Once completely filled, clipped and closed, the encased food product is transported away from the stuffing apparatus. A further length of casing may then be stuffed according to the procedure of the present invention as hereinabove described.

Although the foregoing has been set forth with regard to a preferred embodiment of the apparatus and method of this invention, the same would also apply to other embodiments.

It will be readily appreciated by those skilled in the art that while the encased product is herein described as an encased food product, the apparatus and method of the present invention is suitable for use with any number of materials that may be packaged in a flexible casing material, as, for example dairy compositions, plastic resin formulations, cosmetic and pharmaceutical preparations and the like. The positive shut-off and/or severing of the product being packaged at the outlet end of the casing filling or stuffing device affords many advantages, as, for instance, better control of quantities being packaged, less loss of materials, ability to package chunks of materials or mixtures containing various sizes and the like.

In an embodiment, where, for example, an encased food product such as chicken rolls are to be prepared wherein the feedstock comprises chunks of poultry white meat, dark meat, gelatin and broth, the apparatus of the invention provides not only positive severing and cut-off of flow of the meat chunks, but also a fluid-tight seal to prevent oozing out and loss of broth when the stuffing cycle is terminated. Further, the apparatus and method of the present invention afford the means for encasing two or more products in a single package wherein each of the different products are distinctly discernible and not intermixed in the package.

Although the means described herein to energize and drive certain of the components of the apparatus of the present invention have been described as pneumatic means, it should be understood that other well known means, such as mechanical, hydraulic, electrical and the like or combinations thereof, can also be similarly employed.

While the present invention has been set forth in some detail and described with particularity, it should be understood that changes, modifications and alterations can be made therein without departing from the scope and spirit of the invention.

What is claimed is:

1. A casing stuffing apparatus comprising:
   a. a stuffing means having an inlet end connected to a source of food product and an outlet end;
   b. shut-off means mounted on the outlet end of said stuffing means, said shut-off means consisting essentially of a member mounted on the outlet end and which is substantially non-restrictive of the interior diameter of the outlet end of said stuffing means and a cooperating moving member; and c. means for advancing and retracting said cooperating moving member into and out of positive engagement with said mounted member wherein such engagement seals said outlet end and stops passage of food product therefrom and retraction from engagement permits unrestricted passage of food product from said outlet end.

2. A stuffing apparatus for encased food products comprising:
  a. a stuffing means having an inlet end connected to a source of food product and an outlet end;
  b. a seat mounted on the outlet end of said stuffing means having an interior surface which is substantially a non-restrictive continuation of the interior surface of the outlet end of said stuffing means;
  c. a cooperating moving member positioned adjacent to and aligned with said seat; and
  d. means for advancing and retracting said cooperating moving member into and out of positive engagement with said seat wherein such engagement seals said outlet end and stops passage of food product therefrom and retraction from engagement permits unrestricted passage of food product from said outlet end.

3. The stuffing apparatus of claim 1 wherein said moving member consists essentially of a severing, shut-off member and positive engagement of said severing, shut-off member with said seat stops passage of food product from said outlet end and severs remnants of food product protruding therefrom.

4. The stuffing apparatus of claim 3 wherein said advancing and retracting means includes rotating means for said moving member.

5. The stuffing apparatus of claim 1 wherein said stuffing means inlet end is connected to a plurality of sources of food products.

6. The stuffing apparatus of claim 5 wherein guide means guides and keeps separate food products fed to the inlet end of said stuffing means from each source of food product.

7. The stuffing apparatus of claim 3 wherein said seat comprises an annular nosepiece secured to the outlet end of said stuffing means having a flat end surface and said severing, shut-off member comprises a circular knife-edge positioned adjacent to and aligned with the flat end surface of said seat.

8. The stuffing apparatus of claim 7 wherein said severing and shut-off member is mounted on one end of a rod extending through the entire length of the stuffing means, the second end of the rod being slidably secured adjacent to the inlet end of said stuffing means.

* * * * *